US010039980B2

(12) United States Patent
Matsui et al.

(10) Patent No.: US 10,039,980 B2
(45) Date of Patent: Aug. 7, 2018

(54) VIDEO GAME PROCESSING APPARATUS AND VIDEO GAME PROCESSING PROGRAM PRODUCT

(71) Applicant: KABUSHIKI KAISHA SQUARE ENIX, Tokyo (JP)

(72) Inventors: Ryoma Matsui, Tokyo (JP); Toshio Akiyama, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 1334 days.

(21) Appl. No.: 14/012,346

(22) Filed: Aug. 28, 2013

(65) Prior Publication Data

US 2014/0066195 A1  Mar. 6, 2014

(30) Foreign Application Priority Data

Aug. 31, 2012  (JP) ................................ 2012-191676

(51) Int. Cl.
*A63F 13/40* (2014.01)
*A63F 13/42* (2014.01)
(Continued)

(52) U.S. Cl.
CPC .......... *A63F 13/42* (2014.09); *A63F 13/2145* (2014.09); *A63F 13/533* (2014.09); *A63F 2300/1075* (2013.01)

(58) Field of Classification Search
CPC .... A63F 13/42; A63F 13/2145; A63F 13/533; A63F 2300/1075
See application file for complete search history.

(56) References Cited

U.S. PATENT DOCUMENTS

2006/0073899 A1  4/2006  Kasamatsu et al.
2007/0072662 A1*  3/2007  Templeman ............ A63F 13/00
                                                                    463/6
(Continued)

FOREIGN PATENT DOCUMENTS

JP  2006-102210  4/2006
JP  2007-130367  5/2007
(Continued)

OTHER PUBLICATIONS

Office Action from Japan Patent Office (JPO) in Japanese Patent Appl. No. 2014-121653, dated Jan. 5, 2016, together with an English language translation.
(Continued)

*Primary Examiner* — Jay Liddle
*Assistant Examiner* — Alex F. R. P. Rada, II
(74) *Attorney, Agent, or Firm* — Greenblum & Bernstein, P.L.C.

(57) ABSTRACT

A video game processing apparatus is provided for controlling progress of a video game while displaying a player character on a display screen of a display device provided with a touch panel. The video game processing apparatus is provided with a virtual controller information memory for storing virtual controller information on a virtual controller. The display device is caused to display the virtual controller on the display screen on the basis of the virtual controller information. In a case where an operational input to the virtual controller displayed on the display screen is received, the video game processing apparatus updates a shape of the virtual controller on the basis of the virtual controller information, and controls an action of the player character on the basis of the received operational input. The operational input may include a slide operation and a tap operation, for example.

9 Claims, 10 Drawing Sheets

(51) Int. Cl.
*A63F 13/2145* (2014.01)
*A63F 13/533* (2014.01)

(56) References Cited

U.S. PATENT DOCUMENTS

| | | | |
|---|---|---|---|
| 2011/0032202 A1 | 2/2011 | Aoyagi et al. | |
| 2011/0172013 A1* | 7/2011 | Shirasaka | G06F 3/0488 463/37 |
| 2011/0212776 A1* | 9/2011 | Kishimoto | A63F 13/2145 463/31 |
| 2011/0276879 A1 | 11/2011 | Ando et al. | |
| 2011/0285636 A1* | 11/2011 | Howard | G06F 3/04815 345/173 |
| 2012/0007882 A1 | 1/2012 | Sakurai et al. | |
| 2012/0072857 A1 | 3/2012 | Kubo et al. | |
| 2012/0154311 A1* | 6/2012 | Iijima | A63F 13/2145 345/173 |
| 2012/0169610 A1* | 7/2012 | Berkes | G06F 3/04883 345/173 |
| 2012/0238359 A1* | 9/2012 | Itahana | G06F 3/0488 463/30 |
| 2012/0242590 A1* | 9/2012 | Baccichet | G06F 3/0488 345/173 |
| 2013/0038623 A1* | 2/2013 | Tezuka | G06F 3/04886 345/589 |
| 2013/0084980 A1* | 4/2013 | Hammontree | A63F 13/06 463/36 |
| 2013/0137514 A1 | 5/2013 | Ichimura | |
| 2013/0207920 A1* | 8/2013 | McCann | G06F 3/0488 345/173 |
| 2013/0217498 A1* | 8/2013 | Wang | A63F 13/42 463/37 |
| 2014/0098038 A1* | 4/2014 | Paek | G06F 1/1692 345/173 |
| 2015/0182856 A1* | 7/2015 | Mays, III | A63F 13/2145 463/31 |

FOREIGN PATENT DOCUMENTS

| | | |
|---|---|---|
| JP | 2008-183047 | 8/2008 |
| JP | 2011-034538 | 2/2011 |
| JP | 2011-141632 | 7/2011 |
| JP | 2011-229716 | 11/2011 |
| JP | 2011-258151 | 12/2011 |
| JP | 2012-065801 | 4/2012 |

OTHER PUBLICATIONS

U.S. Appl. No. 14/012,082 to Ryoma Matsui et al., filed Aug. 28, 2013.
Office Action from Japan Patent Office (JPO) in Japanese Patent Application No. 2012-191676, dated Jan. 14, 2014, along with an English language translation thereof.
Office Action from Japan Patent Office (JPO) in Japanese Patent Appl. No. 2014-121653, dated Sep. 27, 2016, together with an English language translation.
BioHazard 4 Mobile edition—BioHazard 4(iPhone/ iPod ver. )Koryaku, iPhone AC (Aug. 2009), available at http://iphoneac.com/biohazard4.html, together with a partial English language translation.
Office Action from Japan Patent Office (JPO) in Japanese Patent Appl. No. 2014-121653, dated Apr. 24, 2018, together with a partial English language translation.

* cited by examiner

VIRTUAL CONTROLLER MANAGING TABLE

| DISPLAY POSITION | | POSITION OF SLIDE OPERATING PORTION | | SHAPE CHANGE POSITION OF TAP OPERATING PORTION | | ... |
|---|---|---|---|---|---|---|
| LEFT SIDE | 1 | CENTER | 1 | — | — | ... |
| RIGHT SIDE | 0 | UPPER | 0 | UPPER | 0 | ... |
| — | — | UPPER RIGHT | 0 | UPPER RIGHT | 0 | ... |
| — | — | RIGHT | 0 | RIGHT | 0 | ... |
| — | — | LOWER RIGHT | 0 | LOWER RIGHT | 0 | ... |
| — | — | LOWER | 0 | LOWER | 0 | ... |
| — | — | LOWER LEFT | 0 | LOWER LEFT | 0 | ... |
| — | — | LEFT | 0 | LEFT | 0 | ... |
| — | — | UPPER LEFT | 0 | UPPER LEFT | 0 | ... |

OBJECT INFORMATION

| OBJECT ID | TYPE | ACTION POSSIBLE RANGE | ACTION CONTENT | DISPLAY START RANGE (DISPLAY START CONDITION) | ... |
|---|---|---|---|---|---|
| N0001 | NPC | WITHIN CIRCLE OF RADIUS R1 | CONVERSATION | WITHIN CIRCLE WITH RADIUS r1 | ... |
| N0002 | NPC | WITHIN CIRCLE OF RADIUS R2 | CONVERSATION | WHEN TO BE DISPLAYED ON DISPLAY SCREEN | ... |
| ⋮ | ⋮ | ⋮ | ⋮ | ⋮ | ⋮ |
| T0001 | TREASURE BOX | WITHIN DISTANCE X1 IN FRONT DIRECTION | APPLICATION OF ITEM | NONE | ... |
| ⋮ | ⋮ | ⋮ | ⋮ | ⋮ | ⋮ |

VIDEO GAME PROCESSING APPARATUS AND VIDEO GAME PROCESSING PROGRAM PRODUCT

CROSS-REFERENCE TO RELATED APPLICATION

The present application relates to subject matter contained in Japanese Patent Application No. 2012-191676, filed on Aug. 31, 2012, the disclosure of which is expressly incorporated herein by reference in its entirety.

BACKGROUND OF THE INVENTION

1. Field of the Invention

The present invention relates to a technique for controlling progress of a video game.

2. Description of the Related Art

Heretofore, various kinds of portable game machines in each of which a player can intuitively carry out various kinds of operations using a touch panel or the like have been proposed (for example, see Japanese Patent Application Publication No. 2008-183047).

In recent years, as a processing capacity of such a portable game machine is improved, video games that have been released for non-portable game machines have been re-released for portable game machines.

However, there has been a problem that interest of a player in the video game may be lowered only by simply changing specification of the video game into one for a portable game machine (in particular, a smartphone provided with a touch panel). Namely, there has been a problem that, even though a virtual controller corresponding to a controller for a non-portable game machine is displayed on a screen with which the portable game machine is provided, for example, it is difficult for the player to carry out a fine operational input because a display size of the virtual controller depends on a size of a screen in the portable game machine.

SUMMARY OF THE INVENTION

The present invention has been made in order to solve the problem described above, and it is an object of the present invention to improve operability of a virtual controller in a portable game machine.

In order to achieve the above object, the present invention is directed to a video game processing apparatus for controlling progress of a video game while displaying a player character on a display screen of a display device provided with a touch panel. The video game processing apparatus according to the present invention includes a virtual controller information memory for storing virtual controller information, the virtual controller information being information on a virtual controller.

The video game processing apparatus also includes a virtual controller display controller for causing the display device to display the virtual controller on the display screen on the basis of the virtual controller information.

The video game processing apparatus also includes an operational input receiver for receiving an operational input to the virtual controller displayed by the virtual controller display controller.

The video game processing apparatus also includes a shape updater for updating a shape of the virtual controller on the basis of the virtual controller information in a case where the operational input receiver receives the operational input.

The video game processing apparatus also includes an action controller for controlling an action of the player character on the basis of the operational input received by the operational input receiver.

By configuring the video game processing apparatus in the manner described above, it is possible to improve operability of the virtual controller in a portable game machine.

In the video game processing apparatus according to the present invention, it is preferable that the virtual controller includes: a slide operating portion for receiving a slide operation; and a tap operating portion for receiving a tap operation, and wherein the shape updater updates the shape of the virtual controller so that the slide operating portion slides in accordance with the content of the operational input and a display shape of the tap operating portion positioned in a slide direction is changed into a predetermined shape in a case where the operational input receiver receives an operational input to the slide operating portion.

In the video game processing apparatus according to the present invention, it is preferable that the slide operating portion is configured to receive a slide operation to each of directions of predetermined number, and that the tap operating portion includes virtual switches of the predetermined number that are respectively provided at positions corresponding to the directions of the predetermined number.

In the video game processing apparatus according to the present invention, it is preferable that the video game processing apparatus further includes: a virtual button information memory for storing virtual button information, the virtual button information being information on at least one virtual button; and a virtual button display controller for causing the display device to display the at least one virtual button on the display screen on the basis of the virtual button information, wherein the at least one virtual button includes a position switching button for receiving a request to switch a display position of each of the virtual controller and the at least one virtual button from a corresponding predetermined initial position to a corresponding second position, and wherein the virtual controller display controller causes the display device to display the virtual controller so as to switch a position of the virtual controller in a case where the position switching button displayed on the display screen is selected.

Moreover, in another aspect of the present invention, the present invention is directed to a non-transitory computer-readable medium including a video game processing program product for causing a computer to control progress of a video game while causing a display device to display a player character on a display screen of the display device. In this case, the display device is provided with a touch panel. Further, the computer includes a virtual controller information memory for storing virtual controller information, the virtual controller information being information on a virtual controller. The video game processing program product causes the computer to execute steps including causing the display device to display the virtual controller on the display screen on the basis of the virtual controller information.

The steps also include receiving an operational input to the virtual controller displayed on the display screen.

The steps also include updating a shape of the virtual controller on the basis of the virtual controller information in a case where the operational input is received.

The steps also include controlling an action of the player character on the basis of the received operational input.

According to the present invention, it is possible to improve operability of a virtual controller in a portable game machine.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings.

DETAILED DESCRIPTION OF THE INVENTION

Hereinafter, an example of one embodiment of the present invention will be described with reference to the appending drawings.

Figure 1:
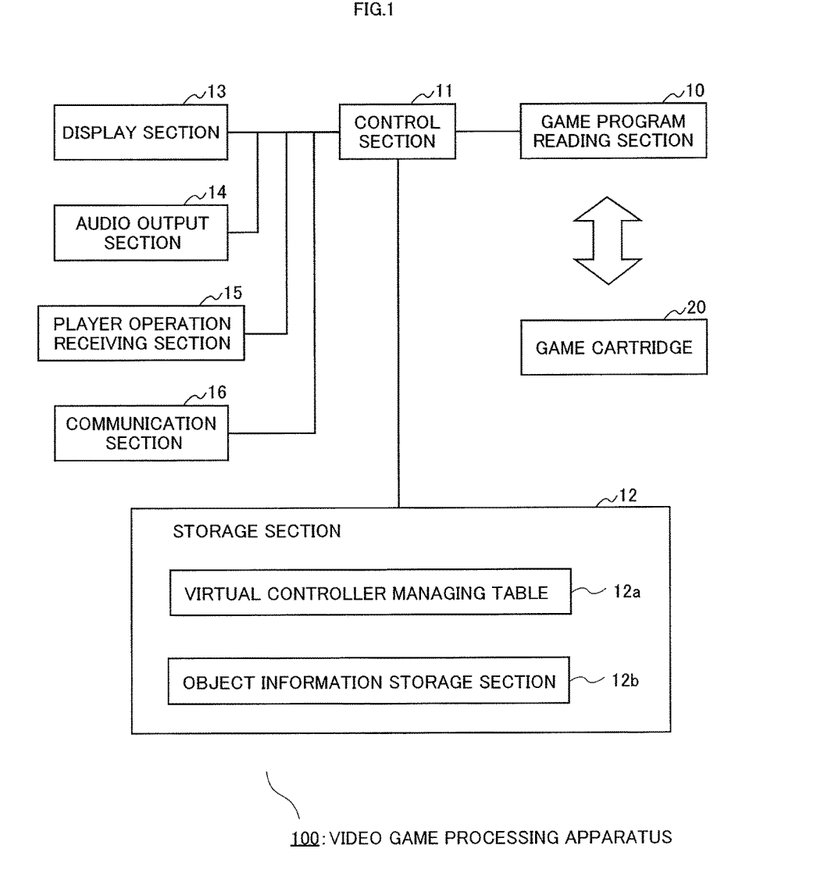
FIG. 1 is a block diagram showing a configuration example of a video game processing apparatus.

FIG. 1 is a block diagram showing a configuration example of a video game processing apparatus 100 according to one embodiment of the present invention. As shown in FIG. 1, the video game processing apparatus 100 includes: a game program reading section 10; a control section 11; a storage section 12; a display section 13; an audio output section 14; a player operation receiving section 15; and a communication section 16.

The game program reading section 10 has a function to read out a necessary video game program from a storage medium. Various kinds of video game programs are stored in the storage medium. In this regard, in the present embodiment, the game program reading section 10 has a mounting section into which a game cartridge 20, in which the video game program is stored, is detachably mounted. A player (that is, an operator (or a user) of the video game processing apparatus 100) reads out a video game program from a storage medium of the game cartridge 20 that is mounted into the mounting section, and stores the read-out video game program in the storage section 12. In this regard, the video game carried out in accordance with the video game program used in the present embodiment may be anyone such as an RPG, a simulation game, a puzzle game and a battle game so long as the video game is a video game in which a virtual controller operated by the player is displayed.

The control section 11 has a function to execute a game program read out by the game program reading section 10 and stored in the storage section 12, and a function to carry out various kinds of controls to cause the video game to proceed in response to an operation of the player.

The storage section 12 is a storage medium for storing video game programs necessary when the video game is caused to proceed and various kinds of data. The storage section 12 is configured by a nonvolatile memory such as a RAM, for example. In the storage section 12, various kinds of information registered and updated in accordance with progress of the video game, and various kinds of information used in the video game, which are read out from the storage medium embedded into the game cartridge 20, are stored.

In this regard, the video game processing apparatus 100 may be configured so that the video game program is downloaded from a video game program providing server (not shown in the drawings) via a communication network such as the Internet or the like and is stored in the storage section 12.

In the present embodiment, the storage section 12 includes a virtual controller managing table 12a and an object information storage section 12b.

The virtual controller managing table 12a is a storage medium for storing virtual controller information that is information on the virtual controller (or a so-called control pad). In the present embodiment, the control section 11 refers to the virtual controller information, and causes the display section 13 to display an image indicating the virtual controller on a display screen thereof. Further, the control section 11 updates the virtual controller information in accordance with progress of the video game, and thereby updates a position and/or a shape of the virtual controller to be displayed on the display screen.

Figure 2:
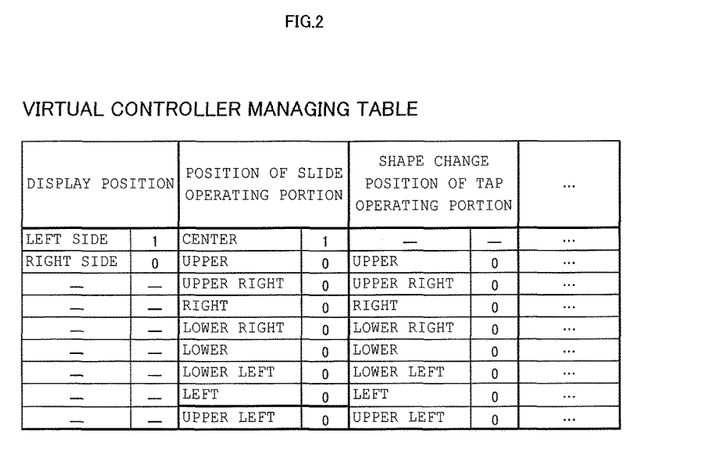
FIG. 2 is an explanatory drawing showing an example of a storage state of virtual controller information.

FIG. 2 is an explanatory drawing showing an example of a storage state of the virtual controller information stored in the virtual controller managing table 12a. As shown in FIG. 2, the virtual controller information contains information that indicates a display position, a position of a slide operating portion and a shape change position of a tap operating portion.

Here, the virtual controller according to the present embodiment will be described.

Figure 3A:
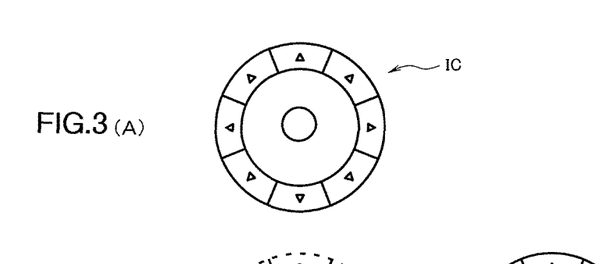
FIGS. 3A and 3B are explanatory drawings showing an example of a virtual controller.
Figure 3B:
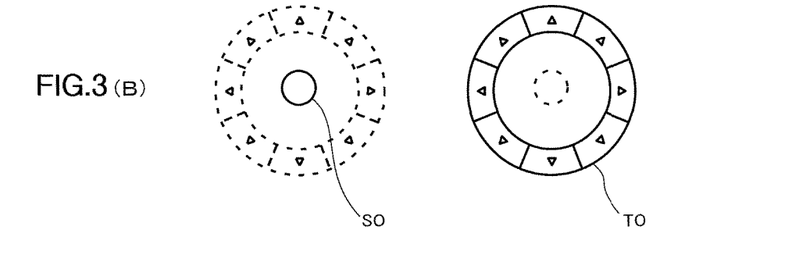

FIG. 3 is an explanatory drawing showing an example of the virtual controller according to the present embodiment. As shown in FIG. 3A, a virtual controller IC is formed in a circular shape. As shown in FIG. 3B, the virtual controller IC is constructed by a slide operating portion SO and a tap operating portion TO. The slide operating portion SO receives a slide operation (or a drag operation) by the player when the slide operating portion SO is displayed on the display screen. The tap operating portion TO receives a tap operation (or a press operation) by the player. In this regard, the video game processing apparatus 100 may be configured so that image information for displaying the virtual controller IC on the display screen and the like are stored in the virtual controller managing table 12a as part of the virtual controller information. Alternatively, the video game processing apparatus 100 may be configured so that the image information and the like are stored in other storage area of the storage section 12.

Figure 4:
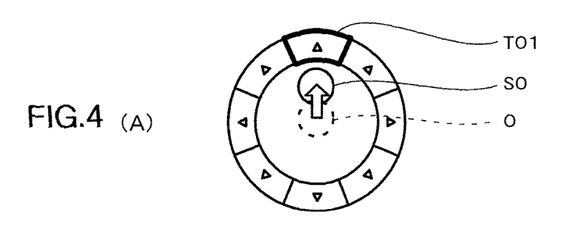
FIGS. 4A and 4B are explanatory drawings showing an example of an operation of the virtual controller.

FIG. 4 is an explanatory drawing showing an example of an operation of the virtual controller according to the present embodiment. As shown in FIG. 4, the virtual controller IC according to the present embodiment indicates two types of actions. Namely, the virtual controller IC is configured so as to receive operational inputs broadly classified into two types (or categories).

First, as shown in FIG. 4A, a motion is illustrated in which the slide operating portion SO is slid from an initial position O toward any one direction of eight directions (that is, upper, upper right, right, lower right, lower, lower left, left and upper left) in accordance with a slide operation by the player (that is, an operation to move a touched position from a state in which a finger or the like of the player is in contact with a display position of the slide operating portion SO while keeping the touched state). In this regard, at this time, a shape of the tap operating portion TO is changed (for example, its color is changed) so that a portion corresponding to the motion of the slide operating portion SO (in FIG. 4A, an upper tap operating portion TO1 corresponding to slide toward the upper direction) can be distinguished from the other portions.

Second, as shown in FIG. 4B, a motion is illustrated in which a shape of the tap operating portion TO is changed in accordance with a tap operation by the player (that is, an operation to touch a display position of the tap operating portion TO by means of a finger or the like) so that a tapped portion (in FIG. 4B, the upper tap operating portion TO1) can be distinguished from the other portions. In this regard, the slide operating portion SO is not changed particularly at this time.

In this regard, the shape and the configuration of the virtual controller 101 are not limited to these examples. They may be configured so as to include an input of a direction by the slide operation and a portion for informing of the player the direction of the inputted slide operation (in the present embodiment, the tap operating portion TO).

In order to manage the virtual controller IC as explained using FIG. 3 and FIG. 4, information indicating the display position, the position of the slide operating portion and the shape change position of the tap operating portion are contained in the virtual controller managing table 12a, as described above.

Here, the display position means a position at which the virtual controller IC is displayed on the display screen. As shown in FIG. 2, two types (left side and right side) are set up in advance as the display position according to the present embodiment, and one whose flag becomes "1" is adopted. The display position will be described again when to explain a movement screen (see FIG. 7).

Further, the "position of the slide operating portion" means a position of the slide operating portion SO movably displayed, as explained with reference to FIG. 4. For example, in a case where the slide operating portion SO is positioned at the initial position (center) as shown in FIG. 4B, "1" is set up to only a flag corresponding to the "center" and "0" is set up to each of the other flags in the virtual controller managing table 12a as shown in FIG. 2. Further, in a case where the slide operating portion SO slides in an upper direction as shown in FIG. 4A (that is, in a case where the slide operating portion SO is positioned at the upper side), "1" is set up to only the flag corresponding to the "upper" in the virtual controller managing table 12a.

Further, the shape change position of the tap operating portion means a position of a portion whose shape is changed so that the portion can be distinguished from the other portions of the plurality of portions that constitute the tap operating portion TO, as explained with reference to FIG. 4. For example, in a case where the shape of the upper tap operating portion TO1 is changed as shown in FIG. 4B, "1" is set up to only the flag corresponding to the "upper" in the virtual controller managing table 12a. In this regard, "1" is set up to only a flag corresponding to the "center" with respect to the position of the slide operating portion at this time.

The object information storage section 12b is a storage medium for storing object information that is information on objects that appear in the video game.

Figure 5:
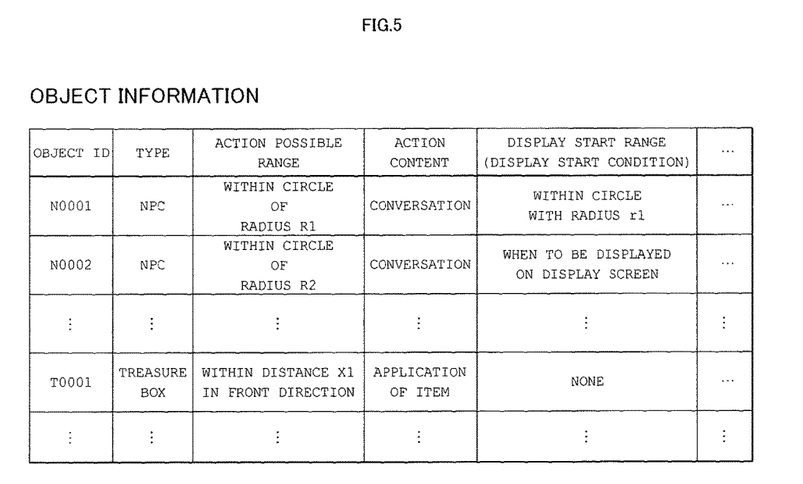
FIG. 5 is an explanatory drawing showing an example of a storage state of object information.

FIG. 5 is an explanatory drawing showing an example of a storage state of the object information stored in the object information storage section 12b. As shown in FIG. 5, the object information contains information including: an object ID for uniquely specifying an object; a type; an action possible range; an action content; and a display start range (or a display start condition).

Here, the "type" means a type set up in advance to an object. For example, the type includes a "non-player character (NPC)", a "treasure box", and the like.

Further, the "action possible range" means a range in which an object that appears in the video game can carry out a predetermined action against the player character. As a configuration of the action possible range, various kinds of configurations such as "within a circle with a radius R1 in which the object is centered" are thought, for example. Hereinafter, an explanation will be made appropriately using a range in which a non-player character may carry out a conversation with the player character (a conversation possible range) as an example. In this regard, the wording "may carry out a conversation" is used because the object may not carry out an action in a case where the player does not input a command even within the action possible range, for example.

Further, the "action content" means the content of an action carried out by an object that appears in the video game, such as a "conversation" and the like. In this regard, a concrete method of making a conversation is not limited in particularly. As the conversation method, a method of displaying a predetermined text on the display screen sequentially may be adopted, or a method of outputting a voice (or audio) may be adopted. In this regard, the action content is also not limited in particularly. The action content may be a battle against the player character. Further, in a case where the type of the object is a "treasure box", application of a predetermined item to the player character may be set up as the "action content".

Further, the "display start range" means a range to start to display an image indicating the action possible range on the display screen when the player character approaches the object. Various kinds of configurations, such as "a circle with a radius r1 using the object as the center thereof", for example, are thought as the display start range.

In this regard, a shape of each of the action possible range and the display start range indicated by the object information is not limited to the circular shape. Various kinds of shapes are thought as the shape thereof. Further, the video game processing apparatus 100 may be configured so that plural pieces of action content are associated with one object. Namely, the video game processing apparatus 100 may be configured so that the action content carried out when the player character is positioned in front of the object is different from the action content carried out when the player character is positioned at the back of the object, for example.

The display section 13 is a display device for displaying the game screen in response to operations by the player in accordance with control by the control section 11. The display section 13 is constructed by a liquid crystal display, for example.

The audio outputting section 14 outputs audio in response to operations by the player and progress of the video game in accordance with control by the control section 11.

The player operation receiving section 15 receives operational signals in response to operations by the player, and notifies the control section 11 of that result. In the present embodiment, the player operation receiving section 15 is configured so as to receive an operation of the player via a touch panel provided in the display section 13. In this regard, the video game processing apparatus 100 may be configured so that the player operation receiving section 15 receives an operation of the player via a controller such as a mouse and a game pad.

The communication section 16 causes the video game processing apparatus 100 to connect to a communication network such as the Internet by wireless or wired connections, and to transmit and receive various kinds of information.

Next, an operation of the video game processing apparatus 100 according to the present embodiment will be described.

Figure 6:
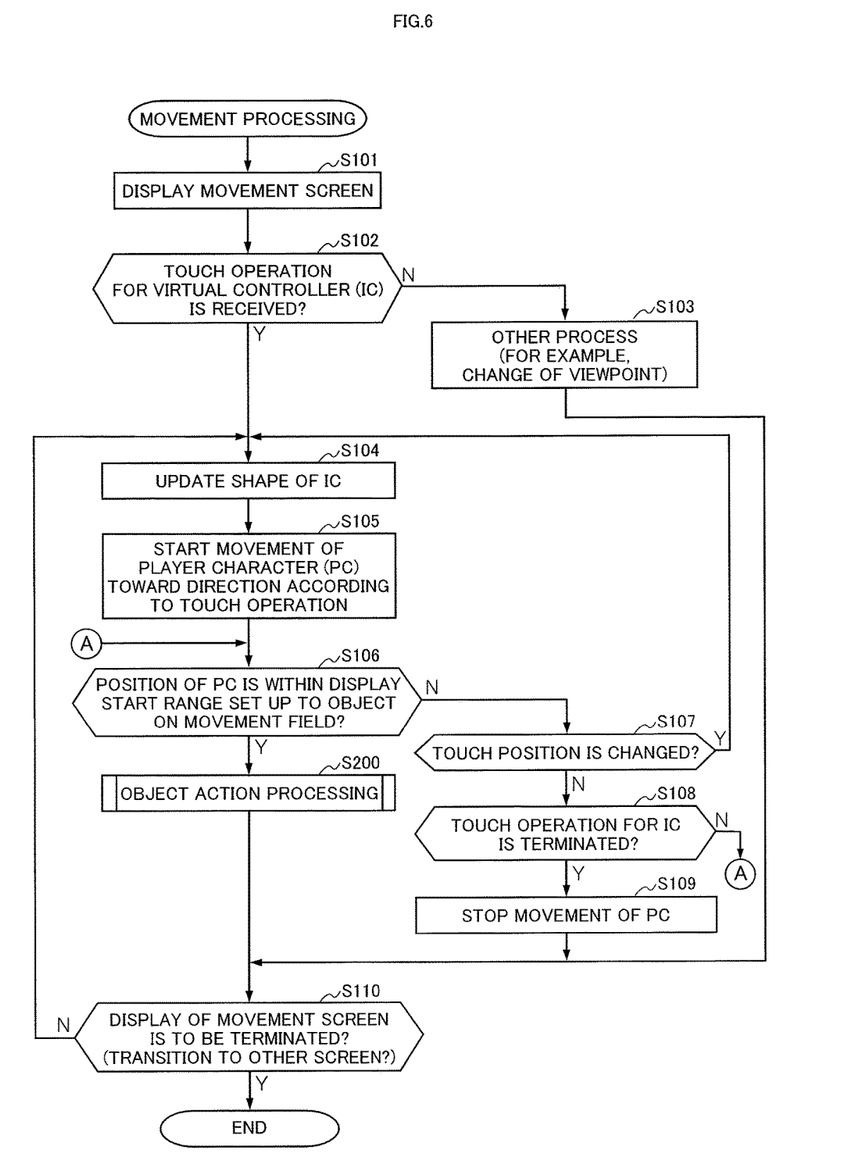
FIG. 6 is a flowchart showing an example of movement processing.

FIG. 6 is a flowchart showing an example of movement processing carried out by the video game processing apparatus 100. In the movement processing, processing to cause the player character to move in a virtual space in accordance with an operational input by the player is carried out. In this regard, the content of processing with no relationship to the present invention may be omitted.

The movement processing is started when a movement condition of the player character is met in accordance with progress of the video game, such as after a battle or conversation is terminated and the like, for example.

In the movement processing, the control section 11 first causes the display section 13 to display a movement screen according to progress of the video game on the display screen (Step S101). In the present embodiment, the control section 11 causes the display section 13 to display a movement screen showing a virtual three dimensional space, in which the player character can move.

Figure 7:
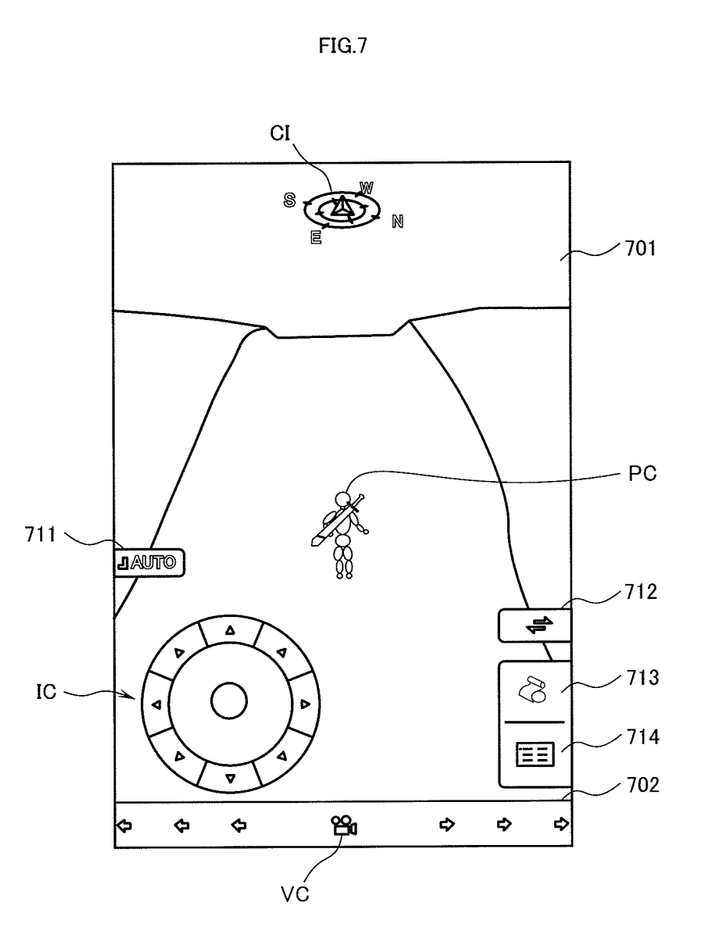
FIG. 7 is an explanatory drawing showing an example of a movement screen.

FIG. 7 is an explanatory drawing showing an example of the movement screen. As shown in FIG. 7, a field display area 701 indicating a virtual space (field) in which the player character exists and a viewpoint operation area 702 are provided in the movement screen.

A virtual controller IC for receiving a movement operation of a player character PC, various kinds of virtual buttons 711 to 714, and a virtual compass CI indicating a direction to which the player character faces are displayed in the field display area 701. A player who is a user of the video game processing apparatus 100 operates the player character PC using the virtual controller IC displayed in the field display area 701.

Here, each of the virtual buttons displayed on the display screen will be described. In the present embodiment, as shown in FIG. 7, an auto button 711, a position switching button 712, a map button 713 and a menu button 714 are displayed as the virtual buttons distinguishably from each other. However, in the present embodiment, the control section 11 causes display section 13 to display the position switching button 712, the map button 713 and the menu button 714 on the display screen when the player character PC is in a stopped state (that is, a state in which the player character PC does not move).

The control section 11 carries out processing set up in advance to each of the virtual buttons in a case where a display area of the corresponding virtual button is selected by the player. More specifically, when it is determined that a selection of any of the virtual buttons is received, the control section 11 carries out the following processes corresponding to the selected virtual button. In this regard, information on each of the virtual buttons is stored in a predetermined storage area of the storage section 12 (a virtual button information storage section, which is not shown in the drawings). Further, the type of the virtual button is not limited to this type. Information on various kinds of virtual buttons (for example, information indicating an icon of a virtual button, a display period, a display position and the processing content carried out when to be selected) may be stored in the virtual button information storage section.

When a selection of the auto button 711 is received, the control section 11 starts processing to cause the player character PC to walk toward the direction to which the player character PC is directed. The control section 11 causes the player character PC to walk until a selection of the auto button 711 is received again or other walking stop condition is met (for example, until an event occurs) (so-called, automatic movement). At this time, the control section 11 receives a control of the direction that the player character PC is moving by means of the whole display screen by setting up a function assigned to the viewpoint operation area 702 onto the whole display screen (that is, the whole touch panel). Namely, the player is allowed to control the moving direction of the player character PC at the automatic movement by sliding the whole display screen and rotating a virtual camera. Further, although it is not shown in the drawings, in the present embodiment, the control section 11 allows visibility of the display screen to be improved by causing the display section 13 not to display the virtual controller IC and the other virtual buttons than the auto button 711 at the automatic movement. In this regard, the viewpoint operation area 702 will be described later in detail.

When the selection of the position switching button 712 is received, the control section 11 switches a display position of the virtual controller IC and a display position of the various kinds of virtual buttons 711 to 714 into the opposite positions in a right-and-left direction. In this regard, the control section 11 updates the setting of the flags regarding the display positions in the virtual controller managing table 12a in accordance with the switching of the positions.

When the selection of the map button 713 is received, the control section 11 causes the display section 13 to display a map showing a place at which the player character PC is positioned. Namely, in a case where the control section 11 receives the selection of the map button 713, the control section 11 shifts a screen displayed on the display screen from the movement screen to a map screen.

When the selection of the menu button 714 is received, the control section 11 causes the display section 13 to display a menu screen showing predetermined content regarding the video game.

Figure 8:
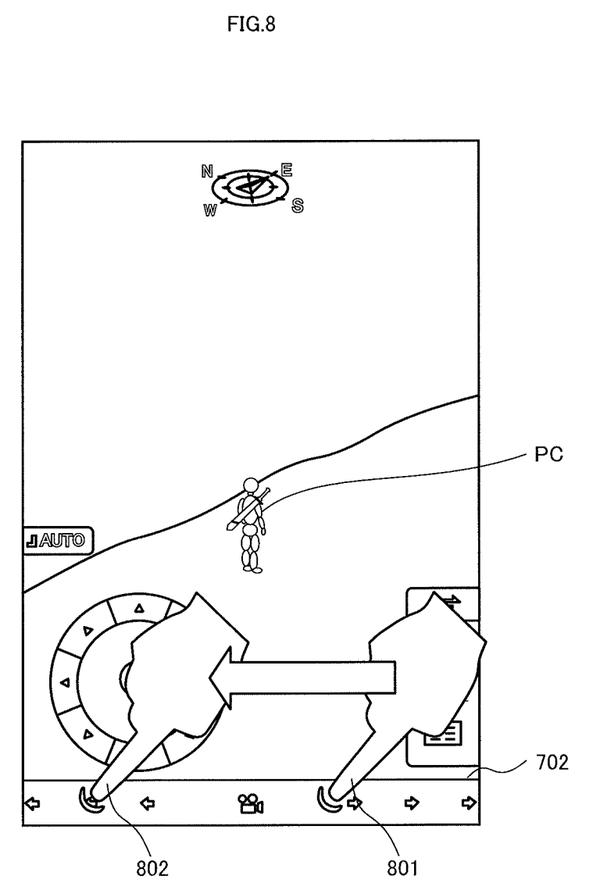
FIG. 8 is an explanatory drawing for explaining a viewpoint operation area.

Next, the viewpoint operation area 702 will be described.

FIG. 8 is an explanatory drawing for explaining the viewpoint operation area 702. When such a "slide operation against the viewpoint operation area 702" to move the touch position from a position 801 to a position 802, as shown in FIG. 8, is received, for example, the control section 11 moves a position (or a viewpoint) of the virtual camera in accordance with the content of the received slide operation (for example, a slide direction, a slide amount, a slide speed and the like). In the present embodiment, the control section 11 rotates, in response to the received slide operation, the position of the virtual camera in the right-and-left direction along a predetermined track using the position of the player character PC at the center. In this regard, the video game processing apparatus 100 may be configured so that the control section 11 rotates the position of the virtual camera in an up-and-down direction in response to a slide operation in a vertical direction. When the position of the virtual camera is moved, the control section 11 causes the display section 13 to display the movement screen according to the movement on the display screen. Further, when a selection of a viewpoint controller VC (that is, a tap operation on a display area of the viewpoint controller VC) is received, the control section 11 moves the virtual camera to a default angle.

When the movement screen is displayed, the control section 11 determines whether a touch operation for the virtual controller IC (the slide operation or tap operation as explained using FIG. 3 and FIG. 4) is received (Step S102). Here, in a case where it is determined that the touch operation for the virtual controller IC is not received, for example, because a slide operation to the viewpoint operation area 702 is received ("No" at Step S102), the control section 11 carries out other process (for example, change of a viewpoint) (Step S103), and causes the processing flow to proceed to a process at Step S110 (will be described later).

On the other hand, in a case where it is determined that the touch operation for the virtual controller IC is received ("Yes" at Step S102), the control section 11 updates the shape of the virtual controller IC on the basis of the virtual controller information in response to the received touch operation (Step S104). Namely, as explained using FIG. 4, the control section 11 updates the image so that the direction according to the slide operation or tap operation by the player can be recognized and a part of the virtual controller IC (more specifically, a part of the tap operating portion) is highlighted compared with the other portions thereof. In this regard, at this time, the control section 11 updates the flag regarding each of the position of the slide operating portion and the shape change position of the tap operating portion in the virtual controller information (see FIG. 2).

When the shape of the virtual controller IC is updated, the control section 11 starts movement of the player character PC toward the direction according to the touch operation (Step S105).

Figure 9:
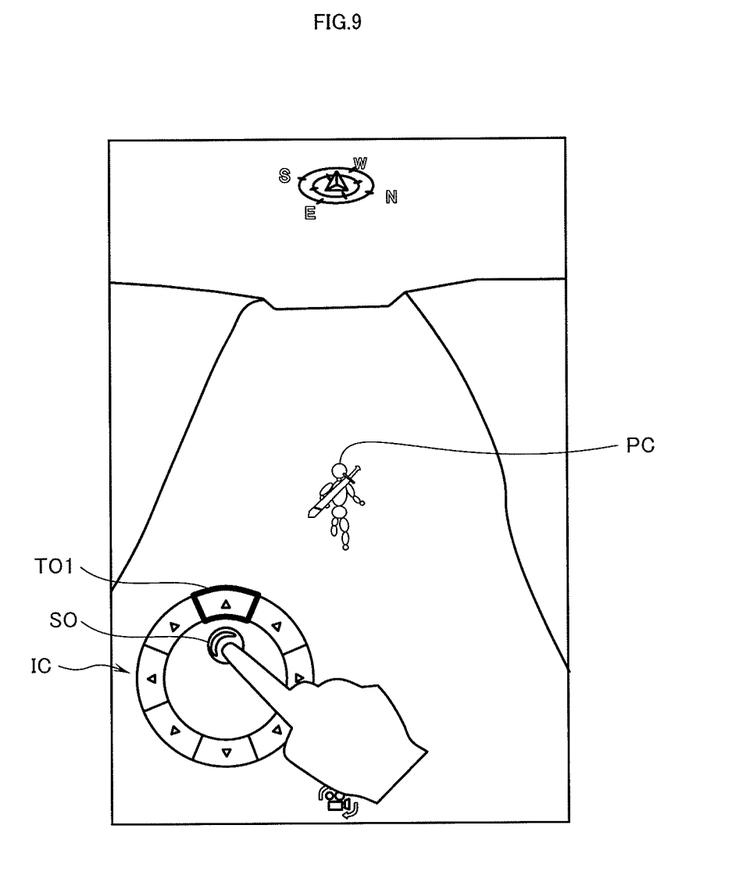
FIG. 9 is an explanatory drawing showing an example of a game screen.

FIG. 9 is an explanatory drawing showing an example of a game screen when the player character PC moves. As shown in FIG. 9, the player character PC moves in a direction according to the position of the slide operating portion SO that constitutes the virtual controller IC. At this time, a portion of the tap operating portion TO, which also constitutes the virtual controller IC, corresponding to the position of the slide operating portion SO (in FIG. 9, the upper tap operating portion TO1 positioned at the upper direction of paper) is highlighted distinguishably from the other portions (in the present embodiment, the portions respectively positioned in the seven directions other than the upper direction of paper).

Under a movement control of the player character PC, the control section 11 determines whether the position of the player character PC is within the display start range set up to the object on a field (movement field) or not (or whether a display start condition is met or not) (Step S106). Here, in a case where it is determined that the position of the player character PC is within the display start range set up to the object on the field ("Yes" at Step S106), the control section 11 carries out processing to carry out an action set up to the object (object action processing) (Step S200), and causes the processing flow to proceed to the process at Step S110 (will be described later). In this regard, the object action processing will be described later in detail (see FIG. 10).

On the other hand, in a case where it is determined at Step S106 in the movement processing (see FIG. 6) that the position of the player character PC is not within the display start range ("No" at Step S106), the control section 11 determines whether the touch position is changed or not (Step S107). Here, in a case where it is determined that the touch position is changed ("Yes" at Step S107), the control section 11 causes the processing flow to proceed to the process at Step S104.

On the other hand, in a case where it is determined that the touch position is not changed ("No" at Step S107), the control section 11 determines whether the touch operation for the virtual controller IC is terminated or not (Step S108). Here, in a case where it is determined that the touch operation for the virtual controller IC is not terminated ("No" at Step S108), the control section 11 continues to control the movement of the player character, and causes the processing flow to proceed to the process at Step S106.

On the other hand, in a case where it is determined that the touch operation for the virtual controller IC is terminated, for example, because a finger of the player moves away from the touch panel ("Yes" at Step S108), the control section 11 stops the movement of the player character PC (Step S109), and determines whether the display of the movement screen is to be terminated or not (Step S110). Here, in a case where it is determined that the display of the movement screen is not to be terminated ("No" at Step S110), the control section 11 continues to display the movement screen, and causes the processing flow to proceed to the process at Step S104. At this time, in the process at Step S104, the control section 11 updates the shape of the virtual controller IC so that the slide operating portion SO is positioned at the initial position and so as not to include a portion at which the tap operating portion TO is highlighted.

On the other hand, in a case where it is determined that the display of the movement screen is to be terminated, for example, by meeting a shift condition to other screen ("Yes" at Step S110), the control section 11 terminates the processing herein.

Figure 10:
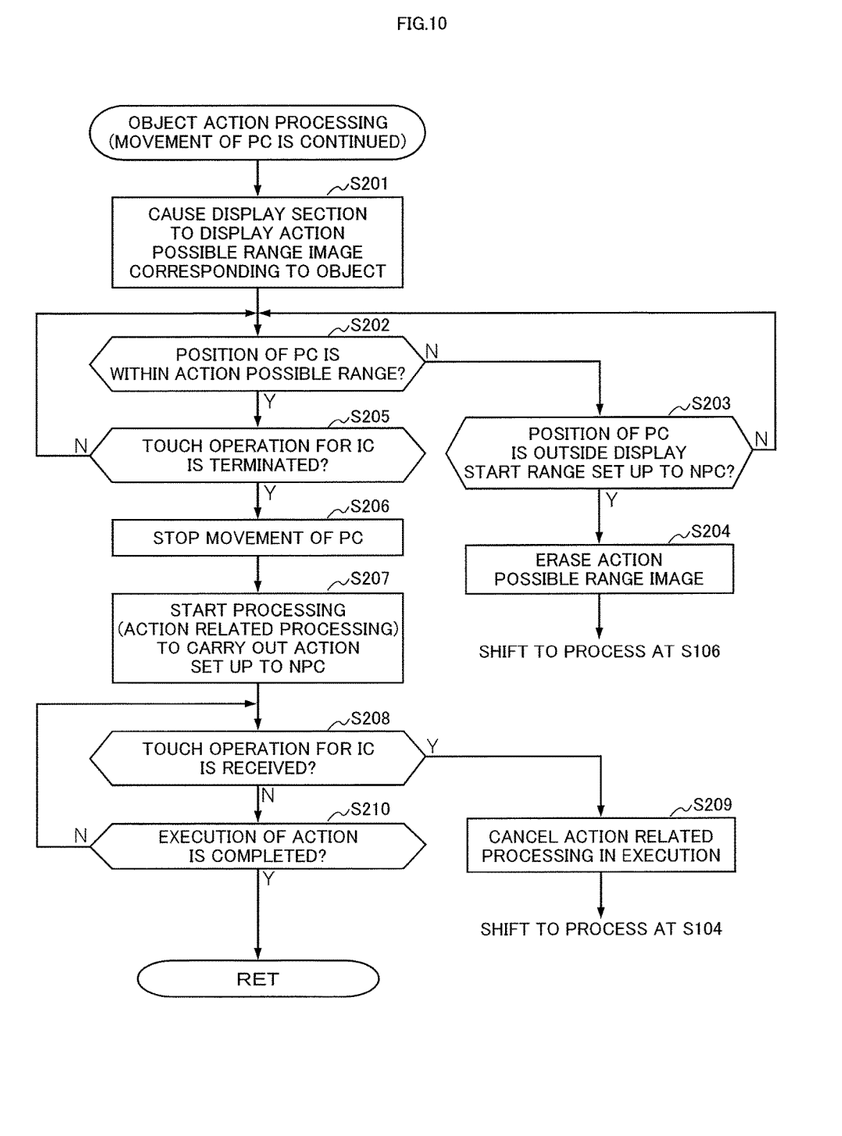
FIG. 10 is a flowchart showing an example of object action processing.

FIG. 10 is a flowchart showing an example of object action processing carried out by the video game processing apparatus 100. In the object action processing, processing to cause the object displayed on the display screen to carry out a predetermined action. In this regard, the content of processing with no particular relationship to the present invention may be omitted. Further, in the present embodiment, the movement of the player character PC is continued except for the case mentioned particularly.

In the object action processing, the control section 11 first causes the display section 13 to display an action possible range image corresponding to an object, in which the player character PC is included within the display start range, on the display screen thereof (Step S201).

Figure 11:
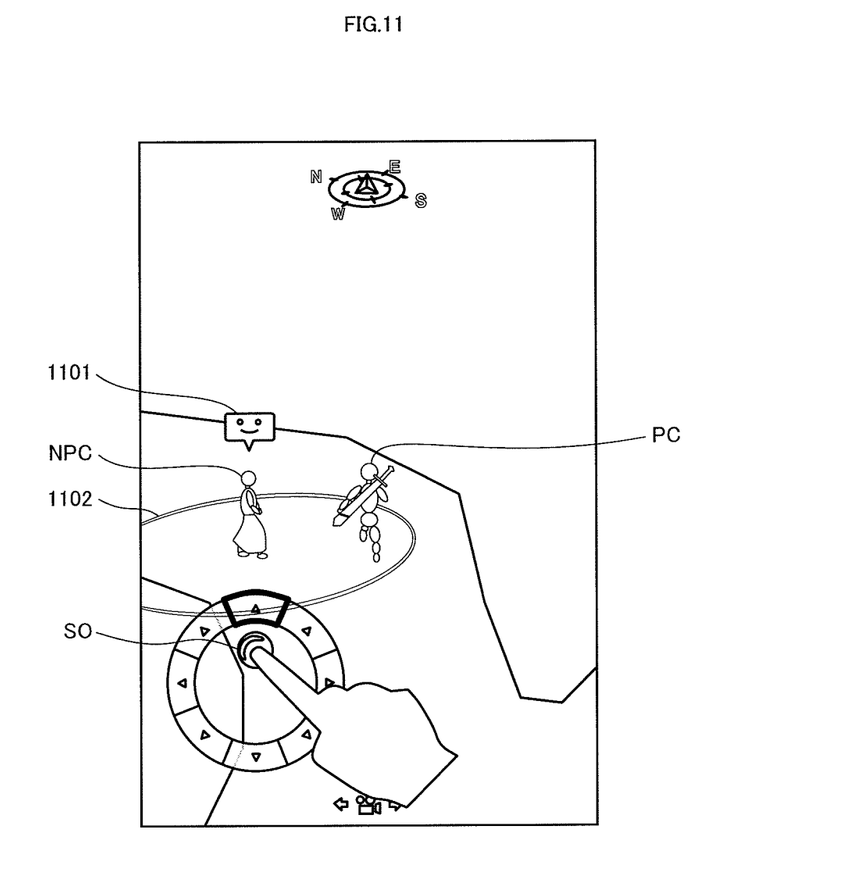
FIG. 11 is an explanatory drawing for explaining an action possible range image.

FIG. 11 is an explanatory drawing for explaining an action possible range image. In FIG. 11, the case where an action possible range image 1102 of a non-player character NPC that is an object arranged in the field is displayed when the player character PC moves into a display start range of the non-player character NPC is illustrated. Further, in the present embodiment, the control section 11 causes the display section 13 to display a speech balloon icon 1101 corresponding to the object in the vicinity of the object in addition to the action possible range image 1102. The control section 11 carries out stop of the movement of the player character PC (see a process at Step S202, which will be described later). In addition, in a case where the speech balloon icon 1101 is selected by the player, the control section 11 carries out an action corresponding to the object.

When the action possible range image is displayed, the control section 11 determines whether the position of the player character PC is within the displayed action possible range indicated by the action possible range image or not (Step S202). Here, in a case where it is determined that the position of the player character PC is not within the action possible range ("No" at Step S202), the control section 11 determines whether the position of the player character PC is positioned outside the display start range set up to the non-player character NPC or not (Step S203).

In a case where it is determined that the position of the player character PC is not positioned outside the display start range set up to the non-player character NPC ("No" at Step S203), the control section 11 causes the processing flow to proceed to the process at Step S202. On the other hand, in a case where it is determined that the position of the player character PC is positioned outside the display start range set up to the non-player character NPC ("Yes" at Step S203), the control section 11 erases the action possible range image 1102 (Step S204), and causes the processing flow to proceed to the process at Step S106 in the movement processing.

On the other hand, in a case where it is determined in the process at Step S202 that the position of the player character PC is positioned within the action possible range ("Yes" at Step S202), the control section 11 determines whether the touch operation for the virtual controller IC is terminated or not (Step S205). Here, in a case where it is determined that the touch operation for the virtual controller IC is not terminated ("No" at Step S205), the control section 11 causes the processing flow to proceed to the process at Step S202.

On the other hand, in a case where it is determined that the touch operation for the virtual controller IC is terminated, for example, because the finger of the player moves away from the touch panel ("Yes" at Step S205), the control section 11 stops movement of the player character PC (Step S206).

When the movement of the player character PC is stopped, the control section 11 carries out processing to carry out an action set up to the non-player character NPC (action related processing) (Step S207). More specifically, the control section 11 refers to the object information corresponding to the non-player character NPC (see FIG. 5), and carries out processing according to the action content contained in the object information.

Figure 12:
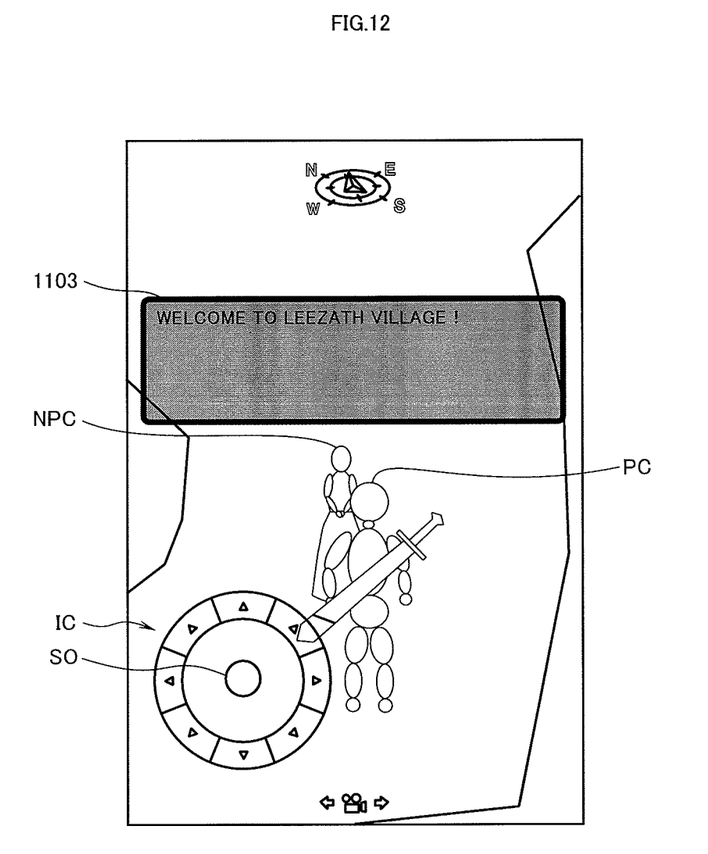
FIG. 12 is an explanatory drawing showing an example of the game screen.

FIG. 12 is an explanatory drawing showing an example of the game screen when "conversation" is carried out as an action. As shown in FIG. 12, the player character PC that stops moving, and a conversation window 1103 indicating character strings set up for a non-player character NPC; are displayed on the game screen. In this regard, at this time, the virtual controller IC is displayed in a state where the virtual controller IC has no highlighted portion and the slide operating portion SO is positioned at the initial position (center).

Further, in the present embodiment, in a case where the player character PC stops moving within the action possible range of the non-player character NPC (that is, within an area indicated by the action possible range image 1102) as shown in FIG. 11, an action set up to the non-player character NPC is to be carried out. However, at this time, the control section 11 carries out processing to move the player character PC toward a predefined position and direction as shown in FIG. 12. In this case, the video game processing apparatus 100 may be configured so that the position and the direction of the player character PC according to the action, the position of the virtual camera, and the like are contained in the object information, for example.

When the action related processing is started, the control section 11 determines whether a touch operation for the virtual controller IC is received or not (Step S208). Here, in a case where it is determined that the touch operation is received ("Yes" at Step S208), the control section 11 cancels the action related processing in execution (Step S209), and causes the processing flow to proceed to the process at Step S104 in the movement processing (see FIG. 6).

On the other hand, in a case where it is determined that the touch operation is not received ("No" at Step S208), the control section 11 determines whether the execution of the action is completed or not (Step S210). Here, in a case where it is determined that the execution of the action is not completed ("No" at Step S210), the control section 11 continues the action related processing, and causes the processing flow to proceed to the process at Step S208.

On the other hand, in a case where it is determined that the execution of the action is completed, for example, because all of character strings each of which indicates the conversation content are displayed ("Yes" at Step S210), the control section 11 terminates the processing herein, and causes the processing flow to proceed to the process at Step S110 in the movement processing.

As explained above, in the embodiment described above, the video game processing apparatus 100 for controlling progress of the video game while displaying the player character PC on the display screen of the display device (for example, the display section 13) provided with the touch panel is configured so as to: include the virtual controller information storage section for storing the virtual controller information that is information on the virtual controller IC (for example, the virtual controller managing table 12a); cause the display device to display the virtual controller IC on the display screen on the basis of the virtual controller information (for example, Step S101); receive an operational input (for example, the touch operation) to the displayed virtual controller IC (for example, Step S102); update the shape of the virtual controller IC on the basis of the virtual controller information in a case where the operational input is received (for example, Step S104); and control an action of the player character PC on the basis of the received operational input (for example, Step S105). Therefore, it is possible to improve operability of the virtual controller in the portable game machine.

In a case where a video game is to be carried out in a portable game machine in particular, the video game processing apparatus 100 may be configured so as to update the shape of the virtual controller IC so that the player is allowed to distinguish the content of the operational input received via the virtual controller IC (in particular, a movement direction of the player character PC). Therefore, it is possible to effectively assist the player to carry out an accurate operational input. This makes it possible to improve operability of the virtual controller.

Further, in the embodiment described above, the video game processing apparatus 100 is configured so that: the virtual controller IC includes the slide operating portion SO for receiving a slide operation and the tap operating portion TO for receiving a tap operation; and the video game processing apparatus 100 updates the shape of the virtual controller IC so that the slide operating portion SO slides in accordance with the content of the operational input and the display shape of the tap operating portion TO is changed into a predetermined shape in a case where the operational input to the slide operating portion SO (for example, the slide operation) is received (for example, see FIG. 7 and FIG. 9). Therefore, it is possible to inform the player of the content of the operational input intuitively.

Further, in the embodiment described above, the video game processing apparatus 100 may be configured so that: the slide operating portion SO is configured to receive a slide operation to each of directions of predetermined number (for example, eight directions); and the tap operating portion TO includes virtual switches (for example, the upper tap operating portion TO1 and the like) of the predetermined number that are respectively provided at positions corresponding to the directions of the predetermined number. Therefore, it is possible to improve operability of the virtual controller IC in that the player is allowed to appropriately select a method of operating the virtual controller IC.

Further, in the embodiment described above, the video game processing apparatus 100 may be configured so as to: include a virtual button information storage section (not shown in the drawings) for storing virtual button information that is information on at least one of the virtual buttons; cause the display section 13 to display the at least one virtual button (for example, the four virtual buttons 711 to 714) on the display screen on the basis of the virtual button information, wherein the position switching button 712 for receiving a request to switch the virtual controller IC and the display position of the at least one virtual button from a predetermined initial position to a second position (for example, from the right side of the display screen to the left side thereof) is included in the at least one virtual button; and switch the position of the virtual controller IC to display it in a case where the position switching button 712 displayed on the display screen is selected (for example, a display position of the position switching button 712 is touched by the player) (not shown in the drawings). Therefore, it becomes possible to improve operability of the virtual controller when to hold the video game processing apparatus 100 in one hand. Namely, for example, in a case where the video game processing apparatus 100 has a vertically long shape and the user holes the video game processing apparatus 100 with only his or her right hand, a finger or fingers of the right hand that can touch the display screen of the display section 13 is basically only a thumb. For that reason, it is preferable that the virtual controller IC and the virtual buttons that are used frequently are respectively arranged at positions near the thumb. The same holds true for the case where the user holds a vertically long terminal with only his or her left hand. For that reason, by providing the position switching buttons so that the player can appropriately switch between the position of the virtual controller and the position of the virtual buttons readily, it is possible to improve operability of the virtual controller.

In this regard, in the embodiment described above, the case where the video game processing apparatus 100 causes the display section 13 to display an icon (for example, the speech balloon icon 1101) for receiving a request to start an action of the object in accordance with the position of the player character PC has been explained. However, the video game processing apparatus 100 may be configured so as to cause the display section 13 to display a navigation window in which character string for explaining the object is shown.

In this case, for example, the object information may be configured so as to contain information on a navigation window.

In this regard, although it has not been mentioned particularly in the embodiment described above, the video game processing apparatus 100 may be configured so as to: select one object in accordance with predetermined selection criteria (for example, select an object positioned at the nearest place from the player character PC) in a case where the player character PC enters an action possible range of each of a plurality of objects; and cause the display section 13 to display only the action possible range image of the selected object. In this case, it is preferable that the video game processing apparatus 100 is configured to carry out an action of the object for which an action possible range image is displayed on the display screen in priority to an action of any of the other objects when the player character PC stops moving at a position where a plurality of action possible ranges are overlapped. In this regard, the video game processing apparatus 100 may be configured so as to; when the player character PC moves within action possible ranges of a plurality of objects, display a speech balloon icon corresponding to each of the objects in the vicinity of the corresponding object; and display an action possible range image of the object positioned the closest to the position of the player character PC (or display the action possible range image of the object positioned the closest to the position of the player character PC and an action possible range image of each of the other objects whose action possible range is not overlapped with the action possible range of the closest object). Further, the video game processing apparatus 100 may be configured so as to select one object in accordance with other selection criteria (for example, a type and/or a level of each object) in a case where a plurality of objects are positioned at substantially the same distance from the player character PC. In this case, the video game processing apparatus 100 may be configured so as to cause the display section 13 to display (or distinguishably display) the action possible range image of each of the plurality of objects from the other action possible range images.

In this regard, although it has not been mentioned particularly in the embodiment described above, the video game processing apparatus 100 may be configured so that an action of the player character PC is varied between an operational input to the slide operating portion SO and an operational input to the tap operating portion TO. Namely, for example, the video game processing apparatus 100 may be configured so as to cause the player character PC to run toward an upper direction in a case where an operational input indicating an upper direction of the display screen using the slide operating portion SO is received. The video game processing apparatus 100 may also be configured so as to cause the player character PC to walk toward an upper direction in a case where an operational input indicating an upper direction of the display screen using the tap operating portion TO is received. By causing the video game processing apparatus 100 to have such a configuration, it is possible to provide the virtual controller IC by which the player can carry out an operation according to the player's intention more easily.

In this regard, in the embodiment described above, the video game processing apparatus 100 is configured so as to carry out various kinds of processings such as game processing described above on the basis of the video game program read out from the game cartridge 20. However, the video game processing apparatus 100 may be configured so as to acquire the video game program via the communication network such as the Internet. Further, the video game processing apparatus 100 may be configured so as to function as a video game server to provide the video game program to a video game terminal via the communication network.

Further, in the embodiment described above, the video game processing apparatus 100 carries out the various kinds of processes described above in accordance with various kinds of control programs (for example, the video game processing program product) stored in a storage device (the storage section 12) with which the video game processing apparatus 100 itself is provided.

INDUSTRIAL APPLICABILITY

The present invention is useful to improve operability of a virtual controller in a portable game machine.

What is claimed is:

1. A video game processing apparatus for controlling progress of a video game while displaying a player character on a display screen of a display provided with a touch panel, the video game processing apparatus comprising:
   a memory that stores virtual controller information, the virtual controller information being information on a virtual controller;
   a processor that causes the display to display the virtual controller on the display screen on a basis of the virtual controller information; and
   an input that receives an operational input to the virtual controller displayed by the processor,
   wherein the processor updates a shape of the virtual controller on the basis of the virtual controller information in a case where the input receives the operational input,
   the processor controls an action of the player character on a basis of the operational input received by the input,
   the virtual controller includes a slide operating portion for receiving a slide operation, and
   the processor updates a shape of the slide operating portion when the slide operation is received as the operational input by the input, with an updated shape of the slide operating portion informing of a direction of the slide operation.

2. The video game processing apparatus according to claim 1, wherein the virtual controller further includes
   a tap operating portion for receiving a tap operation, and
   the processor updates the shape of the virtual controller so that the slide operating portion slides in accordance with the content of the operational input, and a display shape of the tap operating portion positioned in a slide direction is changed into a predetermined shape in a case where the input receives the operational input to the slide operating portion.

3. The video game processing apparatus according to claim 2, wherein the slide operating portion is configured to receive the slide operation to each of directions of a predetermined number, and
   the tap operating portion includes virtual switches of the predetermined number that are respectively provided at positions corresponding to the directions of the predetermined number.

4. The video game processing apparatus according to claim 1, wherein
   the memory stores virtual button information, the virtual button information being information on at least one virtual button,
   the processor causes the display to display the at least one virtual button on the display screen on the basis of the virtual button information,
   the at least one virtual button includes a position switching button for receiving a request to switch a display position of each of the virtual controller and the at least one virtual button from a corresponding predetermined initial position to a corresponding second position, and
   the processor causes the display to display the virtual controller so as to switch the display position of the virtual controller in a case where the position switching button displayed on the display screen is selected.

5. The video game processing apparatus according to claim 1, wherein
   a display position of the slide operating portion is moved in the direction of the slide operation.

6. The video game processing apparatus according to claim 1, wherein
   a portion of the slide operating portion which is updated to inform of the direction of the slide operation is distinguishable from other portions of the slide operating portion.

7. The video game processing apparatus according to claim 1, wherein
   the virtual controller further includes a tap operating portion for receiving a tap operation, and
   the processor updates a shape of the tap operating portion so that a tapped portion is distinguishable from other portions of the tap operating portion.

8. The video game processing apparatus according to claim 1, wherein
   the virtual controller further includes a tap operating portion for receiving a tap operation, and
   the processor updates the shape of the virtual controller on the basis of the virtual controller information when the slide operation is received as the operational input by the input and when the tap operation is received as the operational input by the input.

9. A non-transitory computer-readable medium including a video game processing program product for causing a computer to control progress of a video game while causing a display to display a player character on a display screen of the display, the display being provided with a touch panel,
   the computer comprising a memory that stores virtual controller information, the virtual controller information being information on a virtual controller,
   wherein the video game processing program product causes the computer to execute:
   causing the display to display the virtual controller on the display screen on a basis of the virtual controller information;
   receiving an operational input to the virtual controller displayed on the display screen;
   updating a shape of the virtual controller on the basis of the virtual controller information in a case where the operational input is received; and
   controlling an action of the player character on a basis of the received operational input,
   the virtual controller includes a slide operating portion for receiving a slide operation, and
   a shape of the slide operating portion is updated when the slide operation is received as the operational input, with an updated shape of the slide operating portion informing of a direction of the slide operation.

* * * * *